United States Patent
Liu et al.

(10) Patent No.: US 6,493,495 B1
(45) Date of Patent: *Dec. 10, 2002

(54) LARGE EFFECTIVE AREA WAVEGUIDE FIBER

(75) Inventors: Yanming Liu, Horseheads; Mark A. Newhouse, Corning, both of NY (US)

(73) Assignee: Corning Incorporated, Corning, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 09/610,020

(22) Filed: Jul. 5, 2000

Related U.S. Application Data

(63) Continuation of application No. 09/188,669, filed on Nov. 9, 1998, which is a continuation of application No. 08/378,780, filed on Jan. 26, 1995, now Pat. No. 5,835,655.

(51) Int. Cl.[7] .................................................. G02B 6/18
(52) U.S. Cl. ........................ 385/126; 385/124; 385/123; 385/127
(58) Field of Search ................................ 385/123–128; 359/124, 161

(56) References Cited

U.S. PATENT DOCUMENTS

| | | | | |
|---|---|---|---|---|
| 5,013,131 A | * | 5/1991 | Fotheringham | 385/124 |
| 5,191,631 A | * | 3/1993 | Rosenberg | 385/123 |
| 5,327,516 A | * | 7/1994 | Chraplyvy et al. | 385/123 |
| 5,659,649 A | * | 8/1997 | Nouchi et al. | 385/124 |
| 5,721,800 A | | 2/1998 | Kato et al. | 385/127 |
| 5,835,655 A | * | 11/1998 | Liu et al. | 385/124 |
| 5,852,701 A | | 12/1998 | Kato et al. | 385/127 |
| 6,072,929 A | | 6/2000 | Kato et al. | 385/123 |

FOREIGN PATENT DOCUMENTS

| | | | |
|---|---|---|---|
| GB | 0 689 068 | 12/1995 | G02B/6/22 |

OTHER PUBLICATIONS

Matsuo et al.; "Dispersion Shifted Optical Fiber for Wavelength–division–multiplexing Transmission" Fujikura Giho, Tokyo, Japan, 1993, pp. 1–5.

Nishide et al., "1.55 μm Dispersion Shifted Fibers", Fujikura Denson Giho—Fujikara Technical Review, Tokyo, Japan, No. 18, 1989, pp. 1–7.

Belov et al., "The Realization of Broad–Band Dispersion Compensation using the Multicladding Waveguide Structure" ECOC, vol. 2, Sep. 12, 1993, pp. 349–352.

Croft et al., "Low–Loss Dispersion–Shifted Single–Mode Fiber Manufactured by the OVD Process", Journal of Lightwave Technology, IEEE, New York, vol. 3, No. 5, Oct. 1985, pp. 931–934.

* cited by examiner

*Primary Examiner*—Hemang Sanghavi
(74) *Attorney, Agent, or Firm*—William J. Chervenak; Robert L. Carlson

(57) ABSTRACT

A single mode optical waveguide fiber having a segmented core designed to provide a large effective area for light transmission. The large effective area reduces waveguide fiber non-linearities. The inventive waveguide is thus suited for transmission of high power signals over long distances.

Embodiments of the inventive single mode waveguide including five core segments are given. The large effective area is achieved with essentially no degradation in optical or mechanical performance of the waveguide.

30 Claims, 4 Drawing Sheets

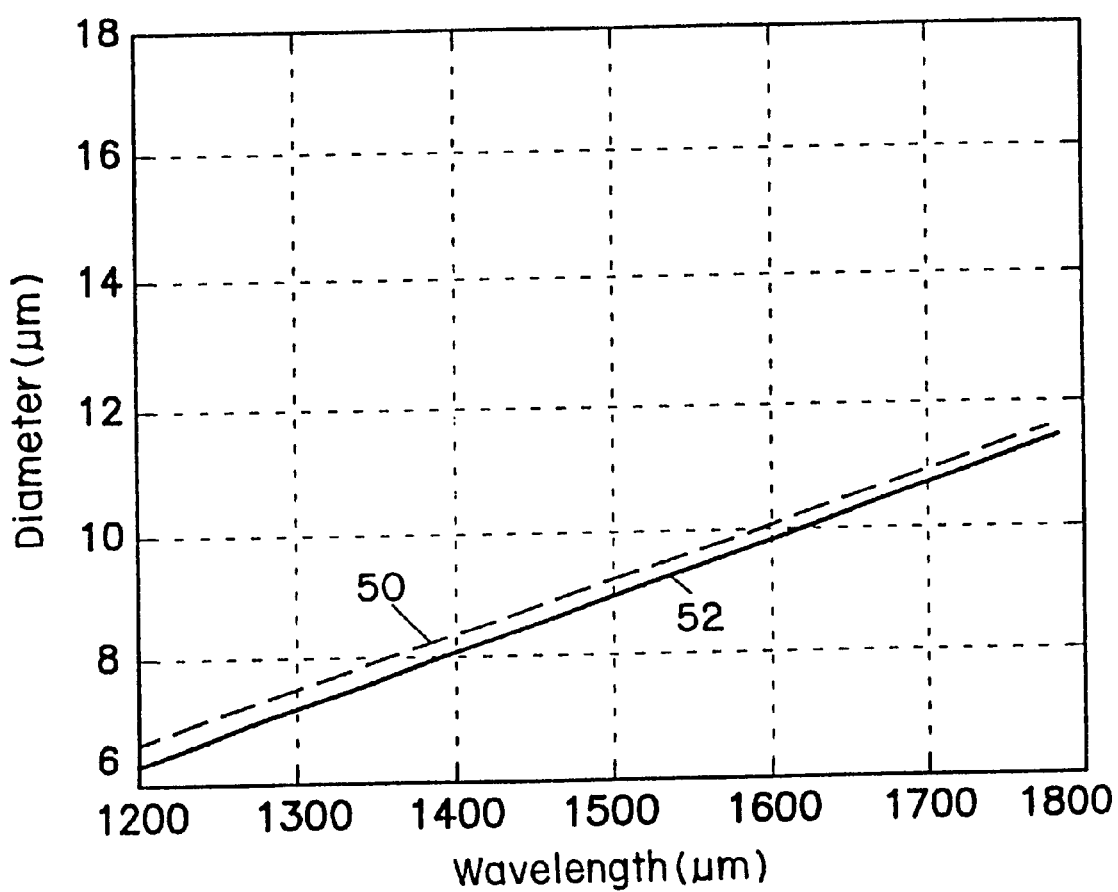

LARGE EFFECTIVE AREA WAVEGUIDE FIBER

This is a continuation of application Ser. No. 09/188,669, filed Nov. 9, 1998, which in turn is a continuation of application Ser. No. 08/378,780, filed Jan. 26, 1995, now U.S. Pat. No. 5,835,655, granted Nov. 10, 1998.

BACKGROUND

The invention relates to a single mode optical waveguide fiber having a large effective area, $A_{eff}$, for light transmission. The large effective area reduces non-linear optical effects, including self phase modulation, four wave mixing, cross phase modulation, and non-linear scattering processes, which can cause degradation of signals in high power systems. In general, a mathematical description of these non-linear effects includes the ratio, $P/A_{eff}$, where P is optical power. For example, a non-linear optical effect usually follows an equation containing a term, $\exp[PxL_{eff}/A_{eff}]$, where $L_{eff}$ is effective length. Thus, an increase in $A_{eff}$ produces a decrease in the non-linear contribution to the degradation of a light signal.

The requirement in the telecommunication industry for greater information capacity over long distances, without regenerators, has led to a reevaluation of single mode fiber index profile design.

The focus of this reevaluation has been to provide optical waveguides which:
  reduce non-linear effects such as those noted above;
  are optimized for the lower attenuation operating wavelength range around 1550 nm;
  are compatible with optical amplifiers; and,
  retain the desirable properties of optical waveguides such as high strength, fatigue resistance, and bend resistance.

A waveguide fiber, having at least two distinct refractive index segments was found to have sufficient flexibility to meet and exceed the criteria for a high performance waveguide fiber system. The genera of segmented core designs are disclosed in detail in U. S. Pat. 4,715,679, Bhagavatula. Species of the profiles disclosed in the '679 patent, having properties especially suited for particular high performance telecommunications systems, are disclosed in applications Ser. Nos. 08/323,795 and 08/287,262.

The present invention is yet another core index profile species which reduces non-linear effects and which is particularly suited to transmission of high power signals over long distances without regeneration. The definition of high power and long distance is meaningful only in the context of a particular telecommunication system wherein a bit rate, a bit error rate, a multiplexing scheme, and perhaps optical amplifiers are specified. There are additional factors, known to those skilled in the art, which have impact upon the meaning of high power and long distance. However, for most purposes, high power is an optical power greater than about 10 mw. For example, a long distance is one in which the distance between electronic regenerators can be in excess of 100 km.

Considering the Kerr non-linearities, i.e., self phase modulation, cross phase modulation and four wave mixing, the benefit of large $A_{eff}$ can be shown from the equation for refractive index. The refractive index of silica based optical waveguide fiber is known to be non-linear with respect to the light electric field. The refractive index may be written as, $$n=n_0+n_2\,P/A_{eff},$$

where $n_0$ is the linear refractive index, $n_2$ is the non-linear index coefficient, P is light power transmitted along the waveguide and $A_{eff}$ is the effective area of the waveguide fiber. Because $n_2$ is a constant of the material, increase in $A_{eff}$ is essentially the only means for reducing the non-linear contribution to the refractive index, thereby reducing the impact of Kerr type non-linearities.

Thus there is a need for an optical waveguide fiber designed to have a large effective area. The window of operation of greatest interest at this time is that near 1550 nm.

Definitions

The effective area is $$A_{eff}=2\pi(\int E^2 r\,dr)^2/(\int E^4 r\,dr),$$

where the integration limits are 0 to ∞, and E is the electric field associated with the propagated light.
An effective diameter, $D_{eff}$, may be defined as, $$A_{eff}=\pi(D_{eff}/2)^2$$

An alpha profile is $$n=n_0(1-\Delta(r/a)^\alpha),$$

where $n_0$ is the refractive index at the first point of the alpha index profile, $\Delta$ is defined below, r is radius, and a is the radius measured from the first to the last point of the alpha index profile, and r is chosen to be zero at the first point of the alpha index profile.

The width of an index profile segment is the distance between two vertical lines drawn from the respective beginning and ending points of the index profile to the horizontal axis of the chart of refractive index vs. radius.

The % index delta is $$\%\,\Delta=[(n_1^2-n_c^2)/2n_1^2]\times 100,$$

where $n_1$ is a core index and $n_c$ is the clad index. Unless otherwise stated, $n_1$ is the maximum refractive index in the core region characterized by a % $\Delta$.

A tapered step index profile, is a step index profile which has been modified by dopant diffusion during the waveguide fiber manufacturing process. The dopant diffusion causes the substantially right angles at the top and bottom of the step to become rounded and the sides of the step to be tapered. The amount of diffusion depends upon several variables including the details of the process steps and upon the initial height and width of the step index profile.

The exact amount of taper is not a critical determinant of the waveguide fiber properties herein discussed. However, a general description of degree of taper may be given.

A sharply tapered step is one in which the width at half the % $\Delta$ is in the range of about 30 to 50% of the base width and the width at 0.9 of the % $\Delta$ is in the range of about 15 to 25% of the base width.

A moderately tapered step is one in which the width at half the % $\Delta$ is in the range of about 60 to 80% of the base width and the width at 0.9 of the % $\Delta$ is in the range of about 35 to 50% of the base width.

The index profiles discussed herein, in general, are in the ranges of sharply or moderately tapered profiles. However, the invention is not limited to profile segments having a particular degree of taper.

SUMMARY OF THE INVENTION

This invention meets the need for a waveguide fiber having an index profile tailored for high performance operation in the 1550 nm window while maintaining a relatively large effective transmission area. It is noteworthy that a large effective area is achieved while maintaining good bend resistance.

A first aspect of the invention is a single mode waveguide fiber having an operating range from about 1500 nm to 1600 nm. A waveguide designed for operation in this wavelength range may be called a dispersion shifted waveguide. That is, the zero of total dispersion lies in range of about 1500 nm to 1600 nm.

The waveguide has a core glass region comprising at least two segments surrounded by a clad glass layer of refractive index $n_c$. The index profiles of the segments comprising the core region are tailored to provide an effective area of at least 70 microns$^2$.

In an embodiment of the first aspect, the core region comprise three segments. The central segment is a tapered step index profile having a maximum % Δ and a width, measured at the base of the step. The exact amount of taper and the shape of the top of the index profile, whether triangular or uneven, is in general not of critical importance. Unless expressly stated otherwise, all widths are measured at the base of a particular core segment. This central segment includes an index depression on the waveguide centerline, i.e., the line of symmetry along the long waveguide fiber axis. This depression approximates the shape of an inverted cone. The central depression is due to the well known dopant loss by diffusion. It is also well known that process differences can increase or decrease the size of this central depression. However, with proper process the central depression can be held relatively constant from waveguide to waveguide. In general, this central depression is not cylindrically symmetric.

A first annular segment, adjacent the central segment, has a substantially constant % Δ and a width. A second annular segment, adjacent the first annular segment, has a tapered step index profile and a width. The geometry and % Δ range, of each core segment, which together provide an $A_{eff}$ greater than about 70 microns, are given in example 1.

A second embodiment of the invention comprises a core region having four segments. The central segment has a substantially constant refractive index $n_0$ and a radius. A first annular segment, adjacent the central segment, has a tapered step index profile of maximum refractive index $n_1$ and a width. A second annular segment, adjacent the first annular segment, has a substantially constant refractive index $n_2$ and a width. A third annular region, adjacent the second annular region, has a tapered step index profile of maximum index $n_3$ and a width. The relationship among the indexes is $n_1 > n_3 > n_0 > n_2$. The detailed description of this embodiment is given in example 2.

A third embodiment of the invention has a core region comprising two segments. The central segment is an alpha profile of maximum refractive index $n_0$. Surrounding this central segment is a segment having a substantially constant refractive index $n_1$ and a width. This surrounding segment may also slope from a higher innermost % index Δ, $n_1'$, to a lower outermost % index Δ. The indexes are such that $n_0 > n_1$ or $n_1' > n_c$. The central segment may have a centerline index depression, due to dopant diffusion, approximating the shape of an inverted cone. Example 3 gives the allowed ranges of refractive index profile and profile shape.

A fourth embodiment of the invention comprises a core region having four segments. The central core segment is cylindrically symmetrical and has a substantially constant refractive index $n_0$ and a radius.

A first annular segment, adjacent the central core, has a tapered step index profile of maximum refractive index $n_1$ and a width. A second annular segment, adjacent the first annulus, has a substantially constant refractive index $n_2$ and a width. A third annular segment, adjacent the second annulus, has a tapered step index profile of maximum index $n_3$ and a width. A fourth annular segment, adjacent the third annulus, has a substantially constant refractive index $n_4$ and a width.

The relations among the indexes are, $n_1 > n_3 > n_o \geq n_c$, and both $n_2$ and $n_4 < n_c$. The appropriate ranges of refractive indexes and profile geometries which yield an $A_{eff}$ greater than 70 microns$^2$ and given in example 4.

A fifth embodiment of the invention comprises a core region having three segments. The central segment is an alpha profile having an alpha of about 1 and a maximum % Δ in the range of about 0.80 to 0.95%. The radius of the central segment is in the range of about 2.5 to 3.5 microns. A first annular segment, adjacent the central segment, has a substantially constant % Δ substantially equal to zero and a width in the range of about 3 to 6 microns. A second annular segment, adjacent the first annular region, has a tapered step index profile of maximum % Δ in the range of about 0.5 to 0.6%. The maximum % Δ of the second annulus is located in the range of about 5.5 to 6.5 microns. The width of the second annulus is in the range of about 1 to 2 microns. Further details of this embodiment are found in example 5.

Another aspect of the invention is a waveguide fiber, designed for use in the wavelength range 1500 nm to 1600 nm, comprising a core region having at least two refractive index segments and a surrounding clad layer. The refractive index profile is chosen to provide an $A_{eff}$ greater than about 70 microns$^2$ and a zero total dispersion greater than 1560 nm and a dispersion slope less than about 0.09 ps/nm$^2$-km.

This remarkable combination of properties may be achieved using a refractive index profile such as those found in several of the examples below.

BRIEF DESCRIPTION OF THE DRAWINGS

FIG. 6 is a chart comparing the calculated effective diameter of the index profile of FIG. 4 compared to the mode field diameter calculated for the profile of FIG. 4.

DETAILED DESCRIPTION OF THE INVENTION

Figure 1:
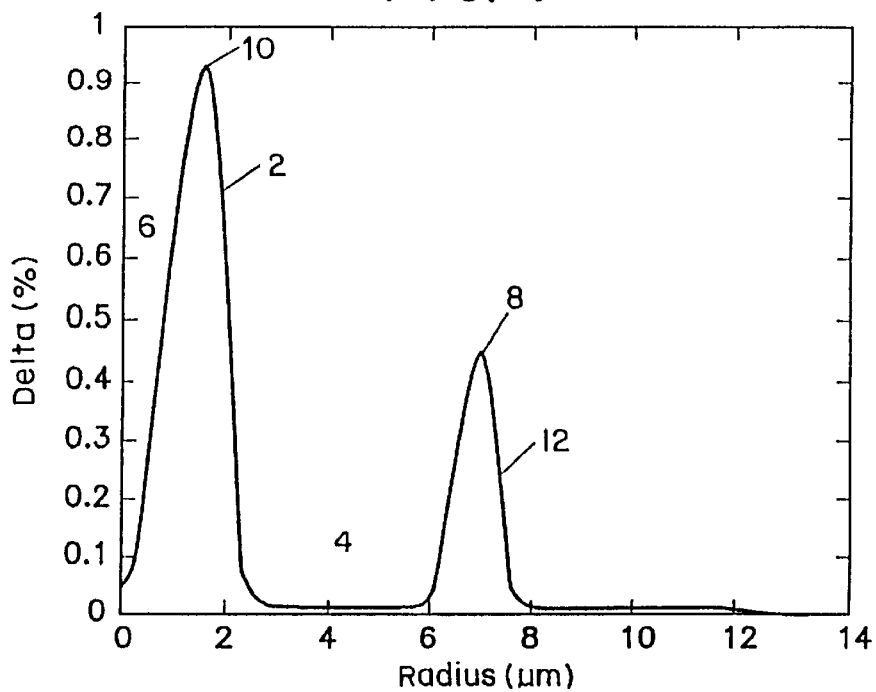
FIG. 1 is a modelled index profile showing a three segment core region and a central index depression.

The segmented core design has been shown to be sufficiently flexible to meet a wide range of waveguide fiber specifications as is shown in the patent and patent applications referenced above.

Changing the shape and location of the refractive index profiles of the segments of a core region, changes the mode power distribution of the propagating light and the waveguide dispersion. Combining a pre-selected waveguide dispersion with a material dispersion allows one to obtain a wide range of shapes and magnitudes for the total or chromatic dispersion of the waveguide. Thus, one can change the location of the total dispersion zero or alter the magnitude or slope of the total dispersion over a pre-selected wavelength range.

In addition, changing the mode power distribution produces changes in mode field diameter, bend resistance and effective area for light transmission.

In general, the mode power distribution and the shape of the waveguide dispersion, cannot be changed completely independently. The variables which define the segmented core structure must be adjusted to obtain the best trade off of properties for a given telecommunication system application. Of the essentially infinite number of possible segmented core designs, a design is sought which provides the desired values for:

zero dispersion wavelength;

cut off wavelength;

magnitude and sign of total dispersion for a pre-selected wavelength range;

slope of total dispersion over a pre-selected wavelength range;

effective area; and, bend resistance.

It is assumed that other essential properties such as maximum attenuation over a pre-selected wavelength range, fatigue resistance and strength are not affected by the core region segmented profile.

The feature of particular importance in the inventive segmented core waveguide is the effective area of the waveguide. As noted above, increasing effective area for transmission of light, decreases the deleterious non-linear effects.

A series of segmented core designs have been found, which increase effective area by about 40% relative to waveguides designed for use in the dispersion shifted window, 1500 nm to 1600 nm, and having analogous index profile shapes. In general, the increase in $A_{eff}$ is greater than 40%.

A typical effective area for a dispersion shifted waveguide is about 50 microns$^2$. The inventive segmented profiles provide an effective area of at least 70 microns$^2$. As will be seen in the following embodiments, the effective area can be made much larger than 70 microns$^2$ while maintaining acceptable bend resistance.

The compromise which is made in the index profile design involves the size and position of the profile segments. A segment having a relatively high maximum refractive index and positioned away from the waveguide centerline will tend to broaden the light power distribution, thereby increasing the effective transmission area. However, as the light power distribution is broadened, the resistance of the waveguide fiber to bend loss decreases. The inventive waveguide fiber provides good bend resistance and larger $A_{eff}$.

EXAMPLE 1
Three Segment Core

The index profile illustrated in FIG. 1 shows a central index profile 2, which is essentially a tapered step index profile, surrounded by a substantially flat profile region 4. The index depression on the waveguide centerline, 6, is due to diffusion during preform processing and is considered a part of the central index profile segment. The maximum % $\Delta$ 10 may have a value in the range of about 0.8 to 0.95% and may be located in a radius range of about 1.5 to 2.5 microns.

The minimum % $\Delta$ of the centerline depression 6 is typically in the range of about 0 to 0.4%. Region 6 is roughly the shape of an inverted cone having a base radius, drawn from the index peak 10 to the centerline, of about 1 to 1.75 microns.

The annulus 4 has a % $\Delta$ of essentially zero and a width in the range of about 3.5 to 4 microns.

The annulus 12 has a maximum % $\Delta$, 8, in the range of about 0.40 to 0.55% and is located in the radius range of about 6.5 to 7.5 microns. The width of annulus 12 is in the range of about 1 to 1.7 microns.

The properties of this design are:

$A_{eff}$ about 75 microns$^2$;

Dispersion zero about 1562; and $LP_{11}$ cut off about 1590 nm.

The properties of this design can be modified by shifting the location of the center of segment 2 outward by about 0.15 microns. The properties of the design then are:

$A_{eff}$ about 86 microns$^2$;

Dispersion zero about 1531 nm; and, $LP_{11}$ cut off about 1598 nm.

Note that the cut off wavelength is measured on the waveguide fiber before cabling. In general, the cabling process decreases the cut off wavelength by an amount greater than about 200 nm.

EXAMPLE 2
Four Segment Core

Figure 2:
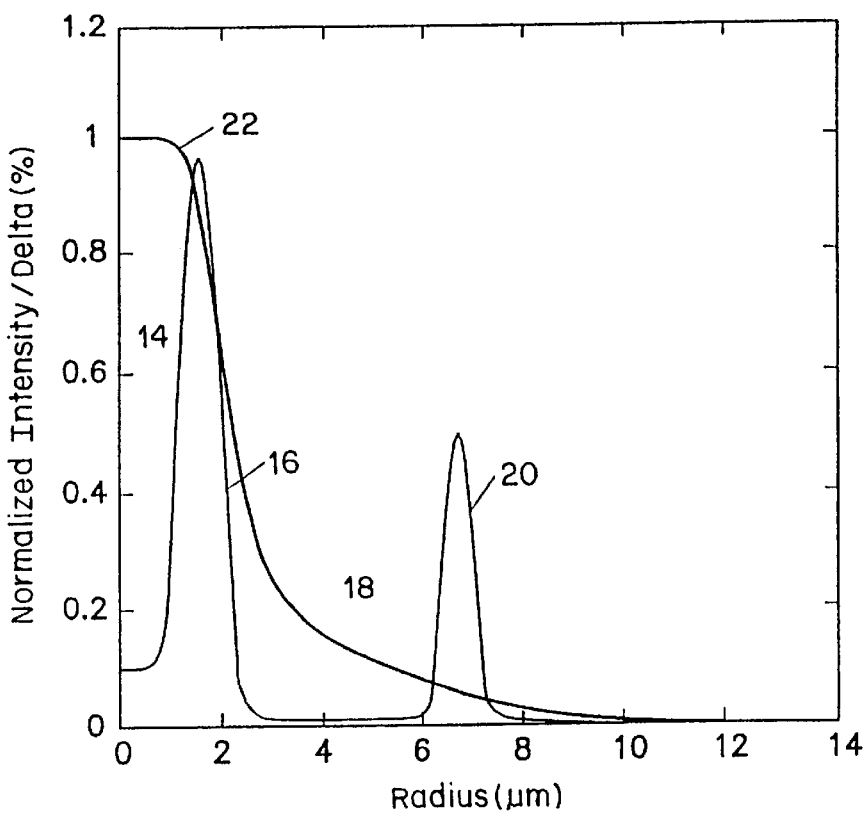
FIG. 2 is a modelled index profile showing a four segment core region.

The core shown in FIG. 2 has segments 14, 16, 18, and 20. Segment 14 is a cylindrically symmetric step index profile of refractive index $n_0$. Annular segment 16, adjacent segment 14, has a tapered step index profile of maximum refractive index $n_1$.

Annular segment 18, adjacent annular segment 16, has a substantially constant refractive index $n_2$.

Annular segment, 20, adjacent annular segment 16 has a tapered step index profile of maximum index $n_3$.

The relationship of these indexes are $n_1>n_3>n_0>n_2$, as can be seen from the figure.

Segment 14 has a radius no greater than about 1 micron and a % index $\Delta$ no greater than about 0.4%. Annular segment 16, has a width no greater than about 2.5 microns and a maximum % index $\Delta$ in the range of about 0.8 to 1%. This maximum occurs at a radius in the range of about 1.5 to 2 microns.

Annular segment 18 has a width in the range of about 2.5 to 4 microns and $n_2$ is about equal to $n_c$.

Annular segment 20 has a width in the range of about 1.5 to 2.5 microns and a maximum % $\Delta$ in the range of about 0.45 to 0.75. This maximum occurs at a radius in the range of about 6.5 to 7.5 microns.

The effective area of the core is about 78 microns$^2$ as compared to an effective area of about 52 microns$^2$ for standard dispersion shifted waveguide fiber, having this segmented core configuration. The power distribution is shown by line 22. The additional effective area of the core index profile shown in FIG. 2, relative to standard dispersion shifted fiber, is a result of the higher % $\Delta$ of annulus 20, which shifts power away from the waveguide center.

Referring now to FIG. 6, note that the effective diameter, line 50, is larger than the mode field diameter, line 52, over the wavelength range of at least 1200 nm to 1700 nm. This may indicate that $D_{eff}$ is more descriptive of the mode power distribution than is the mode field diameter for refractive index profiles of this type.

EXAMPLE 3
Two Segment Core

Figure 3:
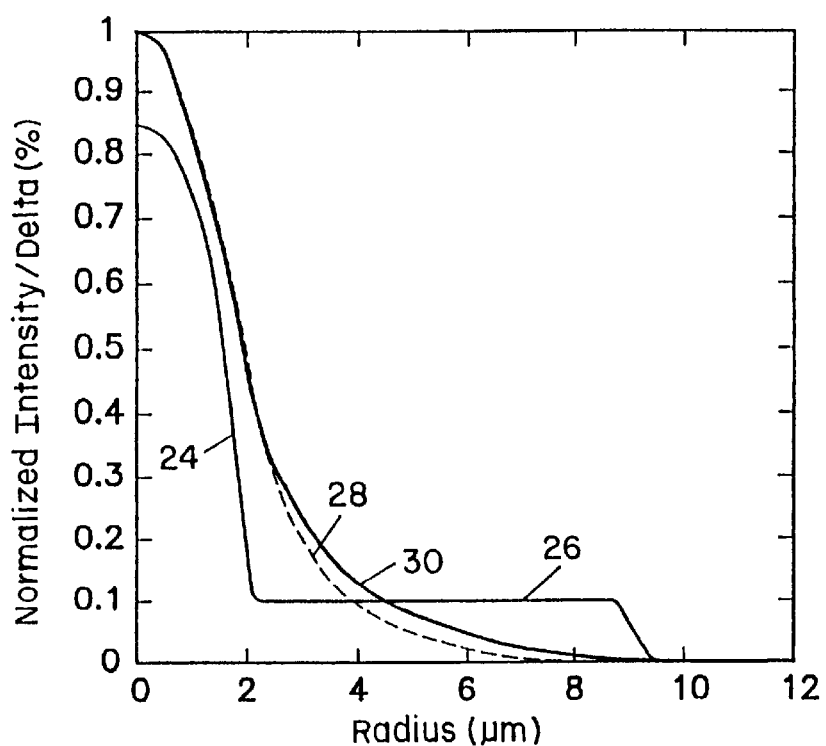
FIG. 3 is a modelled index profile showing a two segment core region.

The two segment core illustrated in FIG. 3 has a central core segment, 24, having an alpha profile with maximum refractive index $n_0$.

Annular segment, 26, adjacent said central segment, has a substantially constant index $n_1$.

The relative magnitudes of the indexes are $n_0 > n_1 > n_c$.

The central core segment has a radius in the range of about 1.75 microns and a % Δ in the range of about 0.8 to 0.9%. The annular segment has a width in the range of about 7.5 to 9.5 microns and a % Δ in the range of about 0.075 to 2%. Analogous to example 2, the effective area of the inventive profile is 75 microns² as compared to about 55 microns² for dispersion shifted fiber, having this index profile type.

In this case the effective area is increased by reducing the alpha profile radius and by increasing the width of the adjacent annulus. The power distribution curve 30 is higher than that for standard dispersion shifted fiber, curve 28, over the radius range from about 2.5 to 8 microns.

This index profile can also be modelled including a centerline refractive index depression, having a minimum % Δ in the range 0 to 0.4%, and having a shape which is essentially an inverted cone having a base radius in the range of about 1 to 1.75 microns. Again effective area can be increased while maintaining the required waveguide fiber properties.

Figure 3A:
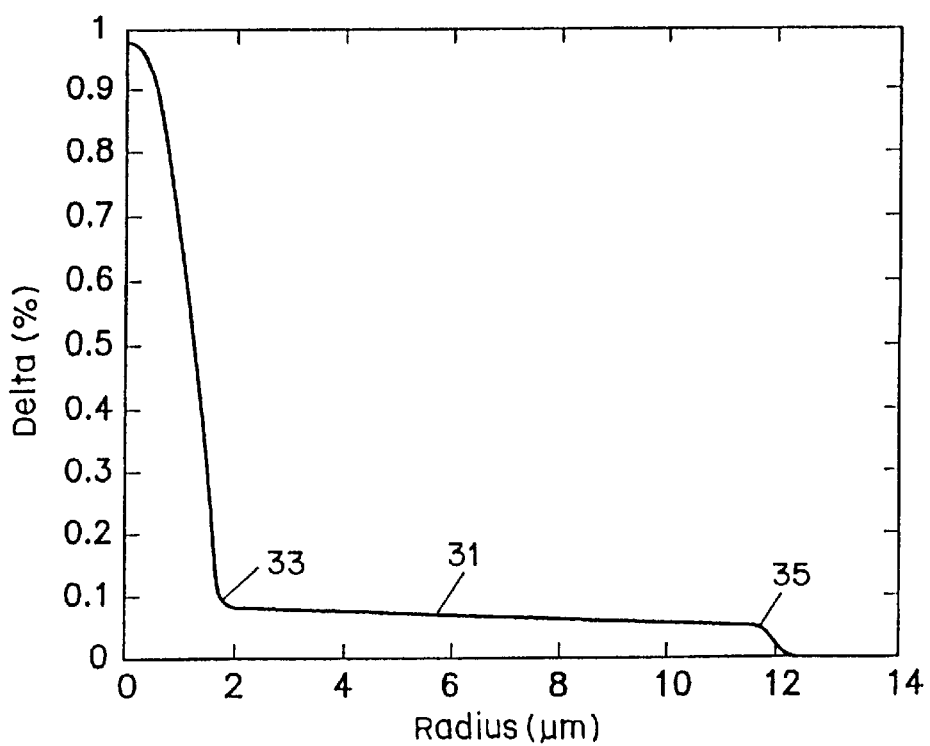
FIG. 3a is a modelled index profile showing a two segment core region wherein the second segment has a negative slope.

A further embodiment of this two segment design is shown in FIG. 3a. In this case the % index Δ of the annular segment, 31, decreases from about 0.09% at point 33, to about 0.05% at point 35. The properties of the index profile of FIG. 3a are calculated to be:

$A_{eff}$ about 86 microns²;

Cut off wavelength about 1600 nm;

Zero dispersion wavelength about 1562 nm; and,

Dispersion slope about 0.12 ps/nm²-km.

EXAMPLE 4
Four Segment Depressed Index

Figure 4:
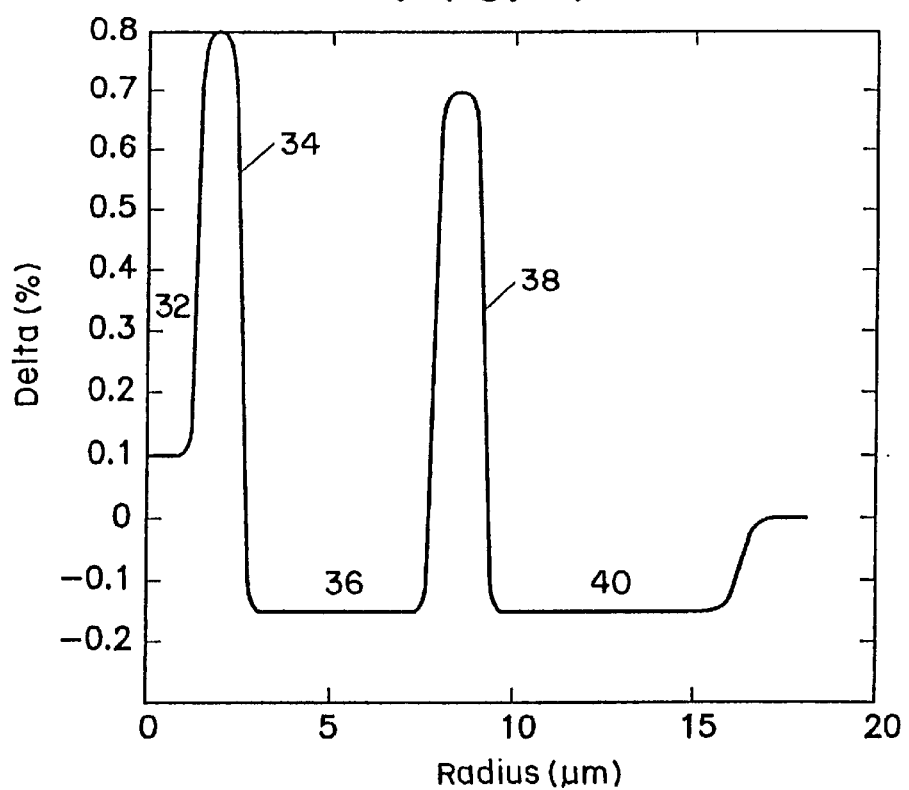
FIG. 4 is a modelled index profile showing a five segment core region wherein two of the segments have a refractive index lower than the clad refractive index.

The refractive index profile of FIG. 4 shows a cylindrically symmetric central segment, 32, having a substantially constant index no. The first annular segment 34, adjacent segment 32, has a tapered step index profile of maximum refractive index $n_1$. The second annular segment 36, adjacent annular segment 34, has a substantially constant index $n_2$.

The third annular segment 38, adjacent annular segment 36, has a tapered step index profile of maximum refractive index $n_3$.

The fourth annular segment 40, adjacent annular segment 38, has a substantially constant index $n_4$.

The relationship among the indexes, as can be seen in FIG. 4 is $n_1 > n_3 > n_0 \geq n_c$ and both $n_2$ and $n_4 < n_c$.

Central segment 32 has a % Δ in the range of about 0.1 to 0.15 % and a radius in the range of about 0.5 to 1 micron. Annular segment 34 has a maximum % Δ in the range of about 0.7 to 0.85%, located in the radius range from about 1.5 to 2.5 microns, and a width in the range of 1 to 2.5 microns, Annular segment 36 has a substantially constant % Δ in the range of about −0.1 to −0.2% and a width in the range of about 3.5 to 4.5 microns.

Annular segment 38 has a maximum % Δ in the range of about 0.55 to 0.7% located in the radius range of about 7 to 9 microns and a width in the range of about 1.75 to 2.5 microns.

Annular segment 40 has a substantially constant % Δ in the range of about −0.1 to −0.2% and a width in the range of about 5 to 7 microns.

This index profile is calculated to have an effective area of about 72.4 microns² as well as a dispersion zero of about 1564 nm and a dispersion slope of about 0.08 ps/nm²-km. The $LP_{11}$ cut off is about 1564 and the predicted bend resistance is good.

This design clearly provides a superior waveguide fiber for use in a high performance telecommunication system using high intensity producing optical amplifiers and wavelength division multiplexing.

Flexibility of this design can be seen from the following comparative calculations.

Segment 34, is made about 0.2 microns wider at the base. Segment 36 is made about 0.3 microns wider. Segment 38 is made about 0.15 microns wider. The resulting index profile provides an effective area of about 79.5 microns², a dispersion zero of about 1563 nm and a dispersion slope of about 0.08 ps/nm²-km. The $LP_{11}$ cut off is 1628 nm as measured on the uncabled waveguide fiber. As is noted above, the cut off wavelength decreases by at least 200 nm in most cable designs.

In a second comparative calculation, segment 32 is decreased by about 0.2 microns, segment 36 decreased by about 0.15 microns and segment 38 increased in base width by about 1 micron. The resulting waveguide fiber has an effective area of about 120 microns², a dispersion zero of 1540 nm and a dispersion slope of 0.11 ps/nm²-km.

EXAMPLE 5
Three Segment Core

Figure 5:
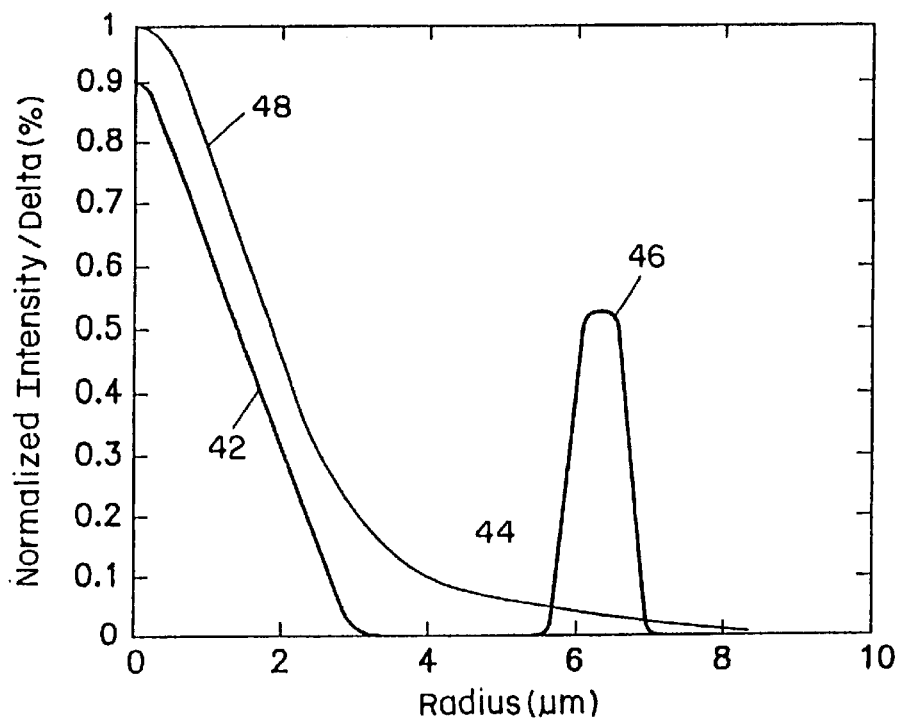
FIG. 5 is a modelled index profile showing a three segment core region.

The central segment 42 of FIG. 5 has an alpha profile, a maximum % Δ in the range 0.80 to 0.95% and a radius in the range of 2.5 to 3.5 microns.

The first annular segment 44, adjacent central segment 42, has a substantially constant % Δ essentially equal to zero and a width in the range of about 3 to 6 microns.

The second annular segment 46, adjacent first annulus 44, is a tapered step index profile, having a maximum % Δ in the range of 0.5 to 0.6%, located at a radius in the range of about 5.5 to 6.5 microns. Annular segment 46 has a width in the range of 1 to 2 microns.

The effective area is about 72 microns² compared to the 52 microns² effective area of a dispersion shifted waveguide index profile having an analogous index profile.

Although specific embodiments and examples of the invention have been herein disclosed, the invention is nonetheless limited only by the following claims.

What is claimed is:

1. A single mode optical waveguide fiber which reduces non-linear optical effects, comprising:

a core region comprising at least two segments, each said segment having a refractive index profile; and, a clad layer, having refractive index $n_c$, surrounding said core region;

said single mode waveguide fiber having a centerline which is the axis of symmetry along the length of said waveguide fiber, wherein the refractive index profiles are configured to provide a dispersion slope less than about 0.09 ps/nm²-km and an effective area of about 70 microns² or greater at 1550 nm.

2. The single mode optical waveguide fiber of claim 1, wherein the zero dispersion wavelength of said fiber is outside the wavelength range of about 1540 nm to 1557 nm.

3. The single mode optical waveguide fiber of claim 2, wherein the zero dispersion wavelength of said fiber is greater than 1400 nm.

4. The single mode optical waveguide fiber of claim 2, characterized in that said fiber exhibits a dispersion slope of about 0.12 ps/nm$^2$-km or less.

5. The single mode optical waveguide fiber of claim 2, wherein the zero dispersion wavelength of said fiber is within a range of about 1500 to 1600 nm.

6. The single mode optical waveguide fiber of claim 1, wherein the zero dispersion wavelength of said fiber is greater than 1400 nm.

7. The single mode optical waveguide fiber of claim 6, characterized in that said fiber exhibits a dispersion slope of about 0.12 ps/nm$^2$-km or less.

8. The single mode optical waveguide fiber of claim 6, wherein the fiber comprises at least a first core central segment having a maximum index $n_1$, a second core segment surrounding the central segment having a maximum index $n_2$, a third core segment surrounding the second segment having a maximum index $n_3$, and a cladding segment surrounding the third segment having a maximum index $n_c$, wherein $n_1 > n_3 > n_2 \geq n_c$.

9. The single mode optical waveguide fiber of claim 8, wherein the zero dispersion wavelength of the fiber lies within a range of about 1500 to 1600 nm.

10. The single mode optical waveguide fiber of claim 9, said fiber exhibiting a $LP_{11}$ cutoff wavelength between about 1564 nm and 1628 nm.

11. The single mode optical waveguide fiber of claim 8, said fiber exhibiting a $LP_{11}$ cutoff wavelength between about 1564 nm and 1628 nm.

12. The single mode optical waveguide fiber of claim 1, wherein said fiber exhibits a dispersion slope of about 0.12 ps/nm$^2$-km or less.

13. The single mode optical waveguide fiber of claim 1, wherein the zero dispersion wavelength of said fiber is within a range of about 1500 to 1600 nm.

14. The single mode optical waveguide fiber of claim 1, said fiber exhibiting a $LP_{11}$ cutoff wavelength between about 1564 nm and 1628 nm.

15. The single mode optical waveguide fiber of claim 1, said fiber exhibiting a $LP_{11}$ cutoff wavelength between about 1564 nm and 1628 nm.

16. The single mode waveguide fiber of claim 1 wherein said core region includes:
a central tapered step index segment having a maximum % Δ in the range of about 0.8% to 0.95%, said step index segment having a centerline index depression of minimum % Δ index in the range of about 0 to 0.4%,
a first annular segment, adjacent said central segment, having a substantially constant % Δ of about 0, and,
a second annular segment, adjacent said first annular segment, having a tapered step index shape and a maximum % Δ in the range of about 0.40% to 0.55%.

17. The single mode waveguide fiber of claim 16
wherein the maximum % Δ of said central segment is located within the radius range of about 1.5 to 2.5 microns, and the maximum % Δ of said second annular segment is located within the radius range of 6.5 to 7.5 microns,
wherein the radius to the outer edge of said central segment is in the range of about 1.75 to 2.5 microns, and the widths of said first annular segment, and of said second annular segment are in the range of about 3.5 to 4 microns, and 1 to 1.7 microns respectively, and,
wherein said centerline index depression is essentially an inverted cone having a base radius in the range of about 1 to 1.75 microns.

18. The single mode waveguide fiber of claim 1 wherein said core region includes:
a cylindrically symmetric step index central segment of refractive index $n_0$;
a first annular segment, adjacent said central region, said first segment having a tapered step index profile of maximum refractive index $n_1$;
a second annular segment, adjacent said first annular segment, having a substantially constant refractive index $n_2$; and,
a third annular segment, adjacent said second annular segment having a tapered step index profile of maximum index $n_3$;
wherein $n_1 > n_3 > n_0 > n_2$.

19. The single mode waveguide fiber of claim 1 wherein said core region includes:
a central tapered step index segment having a maximum % Δ in the range of about 0.8% to 0.95%, said step index segment having a centerline index depression of minimum % Δ index in the range of about 0 to 0.4%,
a first annular segment, adjacent said central segment, having a substantially constant % Δ of about 0, and,
a second annular segment, adjacent said first annular segment, having a tapered step index shape and a maximum % Δ in the range of about 0.45% to 5.5%.

20. A telecommunication system comprising a fiber in accordance with claim 1 and at least one optical amplifier.

21. The system of claim 20, wherein said system employs a power of at least 10 mW.

22. A method of operating the system of claim 20, comprising operating said system at a wavelength range around 1550 nm.

23. The single mode waveguide fiber of claim 1, wherein the fiber further exhibits a zero total dispersion greater than 1560 nm.

24. A single mode optical waveguide fiber which reduces non-linear optical effects, comprising:
a core region comprising at least two segments, each said segment having a refractive index profile; and,
a clad layer, having refractive index $n_c$, surrounding said core region;
said single mode waveguide fiber having a centerline which is the axis of symmetry along the length of said waveguide fiber, wherein the refractive index profiles are configured to provide an effective area of about 70 microns$^2$ or greater at 1550 nm, wherein the fiber comprises at least a first central segment having a maximum index $n_1$, a second segment surrounding the central segment having a maximum index $n_2$, a third segment surrounding the second segment having a maximum index $n_3$, and a fourth cladding segment surrounding the third segment having a maximum index $n_4$, wherein $n_1 > n_3 > n_2 \geq n_4$.

25. The single mode optical waveguide fiber of claim 24, wherein the zero dispersion wavelength of said fiber is outside the wavelength range of about 1540 nm to 1557 nm.

26. The single mode optical waveguide fiber of claim 24, wherein the zero dispersion wavelength of said fiber is greater than 1400 nm.

27. The single mode optical waveguide fiber of claim 24, wherein said fiber exhibits a dispersion slope of about 0.12 $ps/nm^2$-km or less.

28. The single mode waveguide fiber of claim 24, wherein said fiber exhibits a dispersion slope less than about 0.09 $ps/nm^2$-km.

29. A telecommunication system comprising a fiber in accordance with claim 24 and at least one optical amplifier.

30. A method of operating the system of claim 29, comprising operating said system at a wavelength range around 1550 nm.

* * * * *